United States Patent
Imai et al.

(10) Patent No.: US 12,138,577 B2
(45) Date of Patent: Nov. 12, 2024

(54) ADSORBENT FOR CANISTER

(71) Applicant: NIPPON PAPER INDUSTRIES CO., LTD., Tokyo (JP)

(72) Inventors: Daisuke Imai, Tokyo (JP); Yoshihide Watanabe, Tokyo (JP); Yuu Takata, Tokyo (JP); Shunsuke Ozawa, Tokyo (JP); Chie Yoshida, Tokyo (JP)

(73) Assignee: NIPPON PAPER INDUSTRIES CO. LTD., Tokyo (JP)

( * ) Notice: Subject to any disclaimer, the term of this patent is extended or adjusted under 35 U.S.C. 154(b) by 350 days.

(21) Appl. No.: 17/667,106

(22) Filed: Feb. 8, 2022

(65) Prior Publication Data
US 2022/0161182 A1 May 26, 2022

Related U.S. Application Data

(63) Continuation of application No. PCT/JP2020/031504, filed on Aug. 20, 2020.

(30) Foreign Application Priority Data

Aug. 21, 2019 (JP) .................. 2019-151380

(51) Int. Cl.
*B01D 53/00* (2006.01)
*B01D 53/04* (2006.01)
(Continued)

(52) U.S. Cl.
CPC .......... *B01D 53/0415* (2013.01); *B01J 20/20* (2013.01); *B01J 20/28011* (2013.01);
(Continued)

(58) Field of Classification Search
CPC ................ B01D 53/0407; B01D 53/02; B01D 2253/102; B01D 2253/25;
(Continued)

(56) References Cited

U.S. PATENT DOCUMENTS 5,288,307 A * 2/1994 Goltz ...................... B01J 20/26
95/146
6,197,079 B1 * 3/2001 Mori .................. B01D 39/1692
264/293
(Continued)

FOREIGN PATENT DOCUMENTS

CN 1815007 8/2006
JP 5-103979 4/1993
(Continued)

OTHER PUBLICATIONS

Extended European Search Report issued Nov. 8, 2023 in corresponding European Patent Application No. 20855006.1.
(Continued)

*Primary Examiner* — Phutthiwat Wongwian
*Assistant Examiner* — Sherman D Manley
(74) *Attorney, Agent, or Firm* — Wenderoth, Lind & Ponack, L.L.P.

(57) ABSTRACT

An object is to provide a new form of adsorbent suitable for a high performance canister. An adsorbent including activated carbon is used as the adsorbent for the canister and satisfies the following conditions. $P_{0.2/100}$ expressed by Equation 1:

$P_{0.2/100} = X \div Y \times 100$ (Equation 1)

is 18% or more, in Equation 1, X represents an amount of adsorbed n-butane gas per 100 parts by weight of the adsorbent at 25° C. under an atmosphere where a gas pressure of n-butane gas is 0.2 kPa, and Y represents an amount of adsorbed n-butane gas per 100 parts by weight of the adsorbent at 25° C. under an atmosphere where a gas pressure of n-butane gas is 100 kPa.

14 Claims, 1 Drawing Sheet

(51) Int. Cl.
| | |
|---|---|
| *B01J 20/20* | (2006.01) |
| *B01J 20/28* | (2006.01) |
| *D01F 9/16* | (2006.01) |
| *F02M 25/08* | (2006.01) |

(52) U.S. Cl.
CPC ..... *B01J 20/2805* (2013.01); *B01J 20/28066* (2013.01); *B01J 20/28073* (2013.01); *B01J 20/28076* (2013.01); *B01J 20/2808* (2013.01); *D01F 9/16* (2013.01); *B01D 2253/102* (2013.01); *B01D 2253/306* (2013.01); *B01D 2253/308* (2013.01); *B01D 2253/311* (2013.01); *B01D 2257/7022* (2013.01); *B01D 2259/4516* (2013.01); *B01D 2259/4566* (2013.01); *F02M 25/0854* (2013.01)

(58) Field of Classification Search
CPC ...... B01D 2253/306; B01D 2253/3425; B01D 2257/702; B01D 2259/4516; B01D 2259/4566; B60K 15/03504; B60K 2015/03514; B60K 13/02; F02M 25/0854; F02M 25/089; B01J 20/3295; B01J 20/28011; Y02T 10/12
See application file for complete search history.

(56) References Cited

U.S. PATENT DOCUMENTS

| | | | | |
|---|---|---|---|---|
| 6,540,815 | B1* | 4/2003 | Hiltzik | F02M 25/0854 95/146 |
| 7,051,717 | B2* | 5/2006 | Meiller | F02M 25/0854 123/518 |
| 7,159,579 | B2* | 1/2007 | Meiller | F02M 25/0854 123/518 |
| 7,442,232 | B2* | 10/2008 | White | B01J 20/3491 502/103 |
| 7,467,620 | B1* | 12/2008 | Reddy | F02M 25/089 123/519 |
| 7,737,083 | B2* | 6/2010 | Von | A61K 33/44 502/437 |
| 7,753,034 | B2* | 7/2010 | Hoke | F02M 25/0854 123/518 |
| 7,763,104 | B2* | 7/2010 | Arruda | B01D 53/0415 96/154 |
| 8,012,439 | B2* | 9/2011 | Arnold | B01J 29/46 60/272 |
| 8,372,184 | B2* | 2/2013 | Zimmermann | B01J 20/26 502/526 |
| 9,541,043 | B2* | 1/2017 | Fedak | F02M 35/0218 |
| 9,869,281 | B2* | 1/2018 | Cai | F02B 43/10 |
| 10,960,342 | B2* | 3/2021 | Hiltzik | B01J 20/28045 |
| 2004/0182240 | A1* | 9/2004 | Bause | F02M 35/0218 96/108 |
| 2005/0241479 | A1* | 11/2005 | Lebowitz | B01D 53/02 95/146 |
| 2005/0241480 | A1* | 11/2005 | Lebowitz | B01D 53/02 95/146 |
| 2006/0141256 | A1 | 6/2006 | Ishikawa et al. | |
| 2006/0205830 | A1* | 9/2006 | Lebowitz | C08G 18/7621 95/146 |
| 2006/0240980 | A1* | 10/2006 | Hung | B01J 20/3078 428/312.8 |
| 2009/0038477 | A1 | 2/2009 | Abe et al. | |
| 2009/0080142 | A1 | 3/2009 | Nanba et al. | |
| 2010/0212496 | A1 | 8/2010 | Hanamoto et al. | |
| 2014/0305309 | A1* | 10/2014 | McKenna | B01D 53/0407 96/108 |
| 2015/0275727 | A1* | 10/2015 | Hiltzik | F01N 3/0807 95/143 |
| 2017/0067415 | A1* | 3/2017 | Cai | F02M 25/0854 |
| 2018/0363594 | A1* | 12/2018 | Byrne | F02M 25/0854 |
| 2019/0186426 | A1 | 6/2019 | Nakagawa et al. | |
| 2020/0368727 | A1* | 11/2020 | Schmitz | F01N 3/035 |
| 2021/0070617 | A1 | 3/2021 | Yamamoto et al. | |
| 2021/0198111 | A1 | 7/2021 | Imai et al. | |
| 2022/0152580 | A1 | 5/2022 | Imai et al. | |
| 2022/0161182 | A1 | 5/2022 | Imai et al. | |

FOREIGN PATENT DOCUMENTS

| | | |
|---|---|---|
| JP | 10-5580 | 1/1998 |
| JP | 2006-192333 | 7/2006 |
| JP | 2006-213544 | 8/2006 |
| JP | 2007-186403 | 7/2007 |
| JP | 4472636 | 6/2010 |
| JP | 2013-173137 | 9/2013 |
| JP | 2019-108880 | 7/2019 |
| JP | 6568328 | 8/2019 |
| JP | 2019-218943 | 12/2019 |
| TW | 202005701 | 2/2020 |
| WO | 2004/099073 | 11/2004 |
| WO | 2006/022329 | 3/2006 |
| WO | 2019/115810 | 6/2019 |
| WO | 2019/131207 | 7/2019 |

OTHER PUBLICATIONS

Blaker et. al., Investigation of load-dependent heat of adsorption of alkanes and alkenes on zeolites and activated carbon. Microporous and Mesoporous Materials. 2017. 241:1-10, and Appendix A "Support Information" including Table S5, 37 pages.
International Search Reported issued Oct. 27, 2020 in International (PCT) Application No. PCT/JP2020/031504.
Written Opinion of the International Searching Authority issued Oct. 27, 2020 in International (PCT) Application No. PCT/JP2020/031504.
Office Action and Search Report issued Apr. 15, 2021 in Taiwanese Application No. 109128123 with partial English translation.
International Preliminary Report on Patentability and Written Opinion of the International Searching Authority issued Feb. 17, 2022 in International (PCT) Application No. PCT/JP2020/031504.
Notice of Reasons for Revocation issued Jan. 4, 2024 in Japanese Patent No. 7250146 (Application No. 2021-540982), with English language translation.
International Search Report issued May 10, 2022 in International (PCT) Application No. PCT/JP2022/007085.
International Search Report issued May 10, 2022 in International (PCT) Application No. PCT/IP2022/007256.
English language translation of International Preliminary Report on Patentability issued Aug. 29, 2023 in International (PCT) Patent Application No. PCT/IP2022/007256.
English language translation of International Preliminary Report on Patentability issued Aug. 29, 2023 in International (PCT) Patent Application No. PCT/JP2022/007085.
Office Action issued Apr. 12, 2023 in Taiwanese Application No. 111106434 (with partial English translation).
Office Action issued Mar. 2, 2023 in Taiwanese Patent Application No. 111106432, with English language translation.
English language translation of Written Opinion issued May 10, 2022 in International (PCT) Patent Application No. PCT/IP2022/007256.
English language translation of Written Opinion issued May 10, 2022 in International (PCT) Patent Application No. PCT/JP2022/007085.
Blaker, C. et al., "Investigation of load-dependent best of adsorption of alkanes and alkenes on zeolites and activated carbon", Microporous and Mesoporous Materials, 2017, vol. 241, pp. 1-10, and Support information including Tables SI-S7, 37 pages in total.
Abuko, H., "Effect of Average Diameter of Activated Carbon Granules on Estimation of Organic Vapor Breakthrough Time CB Using NTOSH MultiVapor™M Software and Discussion of Its Practical Use", Sangyo Eiseigaku Zasshi, published by the Japan Society for Occupational Health (JSOH), 2014, vol. 56, No. 6, pp. 275-285, concise explanation provided in item CO.

(56) References Cited

OTHER PUBLICATIONS

Baker, F.S. et al., "Carbon, Activated", 2013, vol. 4, pp. 741-761, Kirk-Othmer Encyclopedia of Chemical Technology, John Wiley & Sons.
Baker, F.S. et al., "Carbon, Activated", Abstract, 2003, Kirk-Othmer Encyclopedia of Chemical Technology, John Wiley & Sons.
Wigmans, T., "Industrial Aspects of Production and Use of Activated Carbons", Carbon, 1989, vol. 27, No. 1, pp. 13-22.
Notice of Reasons for Revocation issued Jan. 4, 2024 from Japanese Patent Office in Japanese Patent Application No. 2023-502441, with English language translation, 16 pages.

* cited by examiner

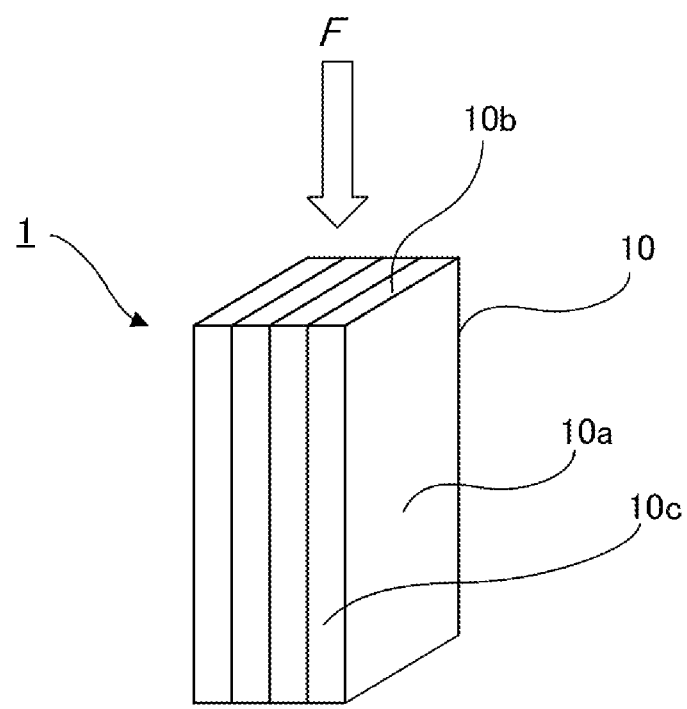

ADSORBENT FOR CANISTER

CROSS-REFERENCE TO RELATED APPLICATIONS

This application is based upon and claims the benefits of priorities from Japanese Patent Application No. 2019-151380, filed Aug. 21, 2019; and International Application No. PCT/JP2020/031504, filed Aug. 20, 2020, the entire contents of which are incorporated herein by reference.

TECHNICAL FIELD

The present invention relates to adsorbents for canisters, and particularly relates to adsorbents for canisters having activated carbon used in the adsorbents.

BACKGROUND ART

Pressure in fuel tanks of vehicles changes as outside air temperature changes, for example, and fuel vapor that has filled the fuel tanks is released from the fuel tanks. These vehicles include motor vehicles, motorbikes (motorcycles), and boats, and have internal-combustion engines for combustion of fuel vapor, such as gasoline. This fuel vapor released is considered to be one of substances causing PM2.5 and photochemical smog. Canisters (also referred to as fuel gas reduction equipment) including adsorbents, such as activated carbon, have been provided to prevent the release of fuel vapor into the atmosphere.

With the recent increase in awareness for environmental conservation, various gas emission regulations tend to be tightened year by year. There is thus a demand for canisters to have higher adsorption performance. In addition, intake performance of motor vehicles tends to be reduced due to the spread of systems including start-stop systems, and desorption of gasoline adsorbed by adsorbents in their canisters thus tends to be difficult. Therefore, there is a demand for adsorbents used in canisters to have higher performance. Activated carbon is often used as an adsorbent used in canisters, and activated carbon formed into granular shapes, powdery shapes, or honeycomb shapes have been proposed (for example, Patent Literature 1).

Furthermore, for improvement of the performance of canisters, some canisters have an adsorbent stored in more than one chamber by being provided with a main chamber and an auxiliary chamber, for example (Patent Literature 2, for example).

CITATION LIST

Patent Literature

Patent Literature 1: Japanese Patent Application Laid-open No. 2013-173137
Patent Literature 2: Japanese Patent Application Laid-open No. 2019-010880

SUMMARY OF INVENTION

Technical Problem

Activated carbon fiber (or fibrous activated carbon) is sometimes referred to as the third activated carbon in contrast with conventional powdered, granular, or pelletized activated carbon. Activated carbon fiber is said to be relatively large in specific surface area, large in adsorption capacity, and high in rate of adsorption and desorption, among different forms of activated carbon in a broad sense. However, activated carbon fiber has not been put to practical use in canisters, and research and development have not advanced sufficiently as to characteristics of activated carbon fiber suitable for practical use in canisters.

Furthermore, there has not been sufficient progress yet in research and development on what kind of adsorbents should be used when plural storage chambers including a main chamber and an auxiliary chamber are to be filled with an adsorbent.

In view of the foregoing, one of objects to be solved by the present invention is to provide a new form of adsorbent suitable for high performance canisters.

Solution to Problem

As a result of conducting diligent study, the inventors have found that an adsorbent having given physical properties is suitable as an adsorbent for high performance layers of canisters, and the inventors have completed the present invention. The present invention can be understood in various aspects and includes the following, for example, as solutions to problems.

[1] An adsorbent comprising: activated carbon, the adsorbent being used for a canister, and having $P_{0.2/100}$ of 18% or more or less, wherein
the adsorbent is an adsorbent including activated carbon, $P_{0.2/100}$ is expressed by Equation 1:

$$P_{0.2/100} = X \div Y \times 100 \qquad \text{(Equation 1)}$$

in Equation 1, X represents an amount of adsorbed n-butane gas (unit: parts by weight) per 100 parts by weight of the adsorbent at 25° C. under an atmosphere where a gas pressure of n-butane gas is 0.2 kPa, and
Y represents an amount of adsorbed n-butane gas (unit: parts by weight) per 100 parts by weight of the adsorbent at 25° C. under an atmosphere where a gas pressure of n-butane gas is 100 kPa.

[2] The adsorbent according to the above item [1], wherein $P_{0.2/100}$ is 21% or more.

[3] The adsorbent according to the above item [1] or [2], wherein
$P_{100/50}$ expressed by Equation 2:

$$P_{100/50} = Y \div Z \times 100 \qquad \text{(Equation 2)}$$

is 120% or less,
in Equation 2, Z represents an amount of adsorbed n-butane gas (unit: parts by weight) per 100 parts by weight of the adsorbent at 25° C. under an atmosphere where a gas pressure of n-butane gas is 50 kPa, and
Y is the same as Y in Equation 1.

[4] The adsorbent according to the above item [3], wherein $P_{100/50}$ is 115% or less.

[5] The adsorbent according to any one of the above items [1] to [4], wherein a specific surface area of the adsorbent is 2500 m²/g or less.

[6] The adsorbent according to any one of the above items [1] to [5], wherein a total pore volume of the adsorbent ranges from 0.50 to 1.20 cm³.

[7] The adsorbent according to any one of the above items [1] to [6], an average pore size of the adsorbent ranges from 1.50 to 2.00 nm or less.

[8] The adsorbent according to any one of the above items [1] to [7], wherein a density of the adsorbent ranges from 0.010 to 0.200 g/cm³.

[9] The adsorbent according to any one of [1] to [8] above, wherein the adsorbent is a formed product of activated carbon fiber.

[10] The adsorbent according to any one of [1] to [9] above, wherein the adsorbent is for a canister used in a motor vehicle.

[11] A canister comprising the adsorbent according to any one of [1] to [10] above.

[12] The canister according to [11] above, wherein
the canister is a canister for a motor vehicle and comprises a main chamber and an auxiliary chamber that each store an adsorbent,
the auxiliary chamber has a volume to store the adsorbent, the volume being smaller than that of the main chamber, and the auxiliary chamber is arranged at a position closer to an opening connected to outside air, compared to the main chamber, and
the adsorbent is stored in the auxiliary chamber.

Advantageous Effects of Invention

Embodiments of the present invention enable provision of a high-performance canister, or an adsorbent suitable for a high-performance layer of a canister.

BRIEF DESCRIPTION OF DRAWINGS

The FIGURE is a diagram schematically illustrating an embodiment of an adsorptive layered product formed of plural activated carbon fiber sheets superposed on one another, and an example of a flow direction of fluid that passes through the adsorptive layered product.

DESCRIPTION OF EMBODIMENTS

Embodiments of the present invention will be described below. The phrase, "ranging from AA to BB," related numerical ranges means "being in the range of AA or more and BB or less" (where "AA" and "BB" represent any numerical values), unless otherwise specified. Furthermore, the units of the lower limit and the upper limit are the same as the unit written immediately after the upper limit (that is, "BB" herein), unless otherwise specified.

In the description of the present invention, both "adsorption" and "desorption" may be comprehensively referred to as "adsorption-desorption."

Furthermore, in the description of the present invention, the term "pore size" means the diameter or width of a pore, rather than the radius of the pore, unless otherwise specified clearly.

1. Adsorbent

An adsorbent of the present invention can be suitably used in canisters. A canister is a piece of equipment that comprises an adsorbent and has a role in reducing vaporized fuel vapor released into the atmosphere by letting the vaporized fuel vapor be adsorbed by the adsorbent and supplying fuel vapor to an engine by letting the fuel vapor adsorbed by the adsorbent be desorbed when the engine is operating. Canisters are generally used in machines or equipment comprising internal-combustion engines that use highly volatile vapor as a fuel, for example, in vehicles and vessels that comprise internal-combustion engines. Examples of these vehicles include motor vehicles that use gasoline as a fuel. Examples of these vessels include boats that use gasoline as a fuel.

A preferred embodiment of the present invention may satisfy at least one or a combination of any two or more of the following conditions each related to a physical property or performance. Each of these conditions will be described below.

A preferred embodiment of the present invention may satisfy a given condition related to an adsorbed amount ratio between different pressures expressed by Equation 1 or Equation 2 below. In the description related to the present invention, a ratio expressed by Equation 1 or 2, for example, and indicating a difference between adsorbed amounts under two atmospheres with different gas pressures is referred to as an adsorbed amount ratio between different pressures (unit: %). An adsorbed amount ratio between different pressures is able to be determined for a combination of various different pressures. In one embodiment, an adsorbed amount ratio between different pressures using an adsorbed amount under an atmosphere of 0.2 kPa and an adsorbed amount under an atmosphere of 100 kPa is expressed by Equation 1. In another embodiment, an adsorbed amount ratio between different pressures using an adsorbed amount under an atmosphere of 100 kPa and an adsorbed amount under an atmosphere of 50 kPa is expressed by Equation 2.

Adsorbed Amount Ratio Between Different Pressures Determined by Equation 1: $P_{0.2/100}$ In a preferred embodiment of the present invention, an adsorbed amount ratio between different pressures (%) expressed by Equation 1 below may be used as a first index.

$$P_{0.2/100} = X \div Y \times 100 \qquad \text{(Equation 1)}$$

In Equation 1, X represents an amount of adsorbed n-butane gas (unit: parts by weight) per 100 parts by weight of the adsorbent at 25° C. under an atmosphere where a gas pressure of n-butane gas is 0.2 kPa.

Furthermore, in Equation 1, Y represents an amount of adsorbed n-butane gas (unit: parts by weight) per 100 parts by weight of the adsorbent at 25° C. under an atmosphere where a gas pressure of n-butane gas is 100 kPa.

In a preferred embodiment of the present invention, the adsorbed amount ratio between different pressures ($P_{0.2/100}$) expressed by Equation 1 may have a lower limit of preferably 18% or more, more preferably 19% or more, and even more preferably 20, 21, 22, 23, 24, or 25% or more.

The adsorbed amount ratio between different pressures ($P_{0.2/100}$) expressed by Equation 1 may have an upper limit of preferably 80%, more preferably 75%, and even more preferably 70, 65, or 60%.

Adsorbed Amount Ratio Between Different Pressures Determined by Equation 2: $P_{100/50}$ In a preferred embodiment of the present invention, an adsorbed amount ratio between different pressures (%) expressed by Equation 2 below may be used as a second index.

Equation 2 below:

$$P_{100/50} = Y \div Z \times 100 \qquad \text{(Equation 2)}$$

In Equation 2, Z represents an amount of adsorbed n-butane gas (unit: parts by weight) per 100 parts by weight of the adsorbent at 25° C. under an atmosphere where a gas pressure of n-butane gas is 50 kPa.

Furthermore, in Equation 2, Y is the same as Y in Equation 1. That is, in Equation 2, Y represents an amount of adsorbed n-butane gas (unit: parts by weight) per 100 parts by weight of the adsorbent at 25° C. under an atmosphere where a gas pressure of n-butane gas is 100 kPa.

The adsorbed amount ratio between different pressures ($P_{100/50}$) expressed by Equation 2 may be preferably 120% or less, more preferably 119% or less, and even more preferably 118, 117, 116, 115, 114, 112, 110, 108, or 106%.

In general, a canister is positioned between a fuel tank, an engine, and an opening for outside air, and gas moves in and out among them. A fuel that has evaporated from the fuel tank is caught by an adsorbent in the canister. When a breakthrough of the capacity of the adsorbent occurs, vapor is released into outside air from the opening for outside air leading from the canister. When the engine is operating, on the other hand, for example, vapor is sent from the adsorbent to the engine due to a negative pressure. That is, the adsorbent in the canister repeats adsorption and desorption of vapor.

In a canister having plural adsorption chambers, adsorbents having characters different from each other are preferably adopted for a main chamber (a first chamber) and an auxiliary chamber (a second or later chamber). There is a demand for the main chamber to catch and remove a large amount of highly concentrated vapor flowing in from the fuel tank, for example. That is, the main chamber is preferably large in adsorption capacity.

The auxiliary chamber where gas flows in from the main chamber, on the other hand, is desirably able to catch vapor that the main chamber has not been able to catch completely. That is, gas flowing in from the main chamber to the auxiliary chamber is relatively low in concentration of vapor and there is thus a demand for the adsorbent in the auxiliary chamber to be high in performance for catching this vapor low in concentration. Therefore, not only having excellent adsorption capability, but also facilitating replacement of gas upon purging of the adsorbent in the canister is preferable.

That is, an adsorbent for a canister, particularly, an adsorbent desired to catch vapor low in concentration preferably has, in addition to excellent adsorption capability, recovery performance for desorption up to a level where adsorption capability is sufficiently recovered. Accordingly, there is a demand for an adsorbent higher in performance, particularly for the auxiliary chamber.

The inventors have found that an adsorbent having an adsorbed amount ratio between different pressures ($P_{0.2/100}$) expressed by Equation 1 of a given numerical value or more may achieve high performance as described above. The higher the index ($P_{0.2/100}$) of Equation 1 is, the higher the performance for adsorption of vapor even under an atmosphere low in pressure of gas, i.e., under an atmosphere low in concentration of gas is. Being high in adsorption performance under an atmosphere low in concentration is suitable for an adsorbent for high performance layers of canisters.

Furthermore, the inventors have found that an adsorbent having an adsorbed amount ratio between different pressures ($P_{100/50}$) expressed by Equation 2 of a given numerical value or less can achieve high performance as described above.

Adsorbed amount ratios between different pressures can be determined for various gas pressures but an adsorbed amount ratio between different pressures determined by Equation 2 is an index indicating, by means of a ratio, the difference between adsorbed amounts under an atmosphere where the pressure of gas is substantially maximum and under an atmosphere where the pressure of gas is half of that substantially maximum pressure (that is, under an atmosphere where the concentration of gas is about 50%).

The adsorbed amount ratio between different pressures ($P_{100/50}$) determined by Equation 2 being 120% or less indicates that the adsorbed amount does not largely change between a case where the concentration of vapor is high and a case where the concentration of vapor is low. In other words, the value of $P_{100/50}$ being 120% or less means that dependence of the adsorption performance on concentration is low. An adsorbent low in dependence on concentration as described above is suitable as an adsorbent for high-performance layers of canisters, the adsorbent being desired to catch vapor even at a low concentration.

An adsorbent including activated carbon with pores that are able to be adjusted is suitable as the adsorbent of the present invention in terms of obtaining an adsorbent having a preferred adsorbed amount ratio between different pressures as described above. Of adsorbents including activated carbon, activated carbon fiber is more preferred in terms of obtaining an adsorbent low in dependence on concentration. Some more suitable examples include: a formed product of activated carbon fiber (hereinafter, such a formed product will also be referred to as an "activated carbon fiber product") that is easy to use as an adsorbent for canisters; and more preferably, activated carbon fiber that has been formed into a sheet form, that is, an activated carbon fiber sheet.

Fulfilling at least one or any two or more of given conditions described below enables provision of a more preferable embodiment of an adsorbent including activated carbon, the adsorbent being used as the adsorbent in the present invention.

Specific Surface Area

The lower limit of specific surface area of the adsorbent that may be used in the present invention and includes activated carbon may be preferably 100 $m^2/g$ or more, more preferably 200 $m^2/g$ or more, and even more preferably 300, 500, 700, 900, 1000, 1100, or 1200 $m^2/g$ or more.

The upper limit of specific surface area of the adsorbent including activated carbon of the present invention may be approximately 2500, 2400, 2300, 2200, or 2100 $m^2/g$ or less.

Setting the specific surface area in the above range achieves more excellent adsorption-desorption performance for fuel vapor. The form of an activated carbon fiber sheet may be suitably adopted, for example, as the adsorbent including activated carbon and having such a specific surface area.

The lower limit of total pore volume of the adsorbent that may be used in the present invention and includes activated carbon may be preferably 0.50 $cm^3/g$ or more, more preferably 0.55 $cm^3/g$ or more, and even more preferably 0.60, 0.65, 0.70, 0.75, 0.80, 0.85, or 0.90 $cm^3/g$ or more.

The upper limit of total pore volume of the adsorbent including activated carbon fiber of the present invention may be preferably 1.20 $cm^3/g$ or less, more preferably 1.15 $cm^3/g$ or less, and even more preferably 1.10, 1.05, 1.03, or 1.00 $cm^3/g$ or less.

Setting the total pore volume in the above range enables the adsorbent including activated carbon to have more excellent adsorption-desorption performance for fuel vapor. The form of an activated carbon fiber sheet may be suitably adopted, for example, as the adsorbent including activated carbon and having such a total pore volume.

Average Pore Size (Average Pore Diameter)

The lower limit of average pore size of the adsorbent that may be used in the present invention and includes activated carbon is preferably 1.50 nm or more, more preferably 1.60 nm or more, and even more preferably 1.70 nm or more.

The upper limit of average pore size of the adsorbent that may be used in the present invention and includes activated carbon may be freely selected but may be preferably 2.50 nm or less, more preferably 2.20 nm or less, and even more preferably 2.00 or 1.90 nm or less.

Setting the average pore size in the above range enables the adsorbent including activated carbon to have more excellent adsorption-desorption performance for fuel vapor. The form of an activated carbon fiber sheet may be suitably adopted, for example, as the adsorbent including activated carbon and having such an average pore size.

Ultramicropore Volume: $V_{0.7}$

With respect to the present invention, the term "ultramicropore" means a pore having a pore size of 0.7 nm or less.

The lower limit of ultramicropore volume of the adsorbent that may be used in the present invention and includes activated carbon may be preferably 0.05 cm$^3$/g or more, more preferably 0.10 cm$^3$/g or more, and even more preferably 0.12 or 0.14 cm$^3$/g or more.

The upper limit of ultramicropore volume of the adsorbent that may be used in the present invention and includes activated carbon may be preferably 0.30 cm$^3$/g or less, more preferably 0.29 cm$^3$/g or less, and even more preferably 0.26, 0.24, 0.22, or 0.20 cm$^3$/g or less.

Setting the ultramicropore volume in the above range enables the adsorbent including activated carbon to have more excellent adsorption-desorption performance for fuel vapor. The form of an activated carbon fiber sheet may be suitably adopted, for example, as the adsorbent including activated carbon and having such an ultramicropore volume.

Micropore Volume: $V_{2.0}$

With respect to the present invention, the term "micropore" means a pore having a pore size of 2.0 nm or less.

The lower limit of micropore volume of the adsorbent that may be used in the present invention and includes activated carbon may be preferably 0.50 cm$^3$/g or more, more preferably 0.60 cm$^3$/g or more, and even more preferably 0.65 or 0.70 cm$^3$/g or more.

The upper limit of micropore volume of the adsorbent that may be used in the present invention and includes activated carbon may be preferably 1.00 cm$^3$/g or less, more preferably 0.90 cm$^3$/g or less, and even more preferably 0.80 cm$^3$/g or less.

Setting the micropore volume in the above range enables the adsorbent including activated carbon to have more excellent adsorption-desorption performance for fuel vapor. The form of an activated carbon fiber sheet may be suitably adopted, for example, as the adsorbent including activated carbon and having such an ultramicropore volume.

Pore Volume of Pores Having Pore Size Larger than 0.7 nm and Equal to or Smaller than 2.0 nm: $V_{0.7\text{-}2.0}$ A pore volume $V_{0.7\text{-}2.0}$ of pores having pore sizes larger than 0.7 nm and equal to or smaller than 2.0 nm can be determined by Equation 3 below using a value "a" of ultramicropore volume and a value "b" of micropore volume.

$$V_{0.7\text{-}2.0} = b - a \quad \text{(Equation 3)}$$

The lower limit of pore volume $V_{0.7\text{-}2.0}$ of pores in the adsorbent that may be used in the present invention and includes activated carbon, the pores having pore sizes larger than 0.7 nm and equal to or smaller than 2.0 nm, may be preferably 0.30 cm$^3$/g or more, more preferably 0.36 cm$^3$/g or more, and even more preferably 0.38, 0.40, or 0.50 cm$^3$/g or more.

The upper limit of pore volume $V_{0.7\text{-}2.0}$ of the pores in the adsorbent that may be used in the present invention and includes activated carbon, the pores having pore sizes larger than 0.7 nm and equal to or smaller than 2.0 nm, may be preferably 1.00 cm$^3$/g or less, more preferably 0.90 cm$^3$/g or less, and even more preferably 0.80, 0.75, 0.70, 0.65, or 0.60 cm$^3$/g or less.

Setting the pore volume $V_{0.7\text{-}2.0}$ in the above range enables the adsorbent including activated carbon to have more excellent adsorption-desorption performance for fuel vapor. The form of an activated carbon fiber sheet may be suitably adopted, for example, as the adsorbent including activated carbon and having such an ultramicropore volume.

Ratio of Volume of Ultramicropores to Volume of Micropores: $R_{0.7/2.0}$

A ratio $R_{0.7/2.0}$ of the pore volume of ultramicropores having pore sizes of 0.7 nm or less to the pore volume of micropores having pore sizes of 2.0 nm or less can be determined by Equation 4 below using the value "a" of the ultramicropore volume and the value "b" of the micropore volume.

$$R_{0.7/2.0} = a/b \times 100(\%) \quad \text{(Equation 4)}$$

The lower limit of the ratio $R_{0.7/2.0}$ of the ultramicropore volume to the micropore volume in the adsorbent that may be used in the present invention and includes activated carbon may be preferably 15.0% or more, more preferably 18% or more, and even more preferably 19% or more.

The upper limit of the ratio $R_{0.7/2.0}$ of the ultramicropore volume to the micropore volume in the adsorbent that may be used in the present invention and includes activated carbon may be preferably 60% or less, more preferably 50% or less, and even more preferably 40, 30, or 25% or less.

Setting the ratio $R_{0.7/2.0}$ of the ultramicropore volume in the above range enables the adsorbent including activated carbon to have more excellent adsorption-desorption performance for fuel vapor. The form of an activated carbon fiber sheet may be suitably adopted, for example, as the adsorbent including activated carbon and having such an ultramicropore volume.

Basis Weight (Weight Per Unit Area)

The lower limit of basis weight of the adsorbent that may be used in the present invention and includes activated carbon may be preferably 50.0 g/m$^2$ or more, more preferably 60.0 g/m$^2$ or more, and even more preferably 70.0 or 80.0 g/m$^2$ or more.

The upper limit of basis weight of the adsorbent that may be used in the present invention and includes activated carbon may be preferably 200 g/m$^2$ or less, more preferably 150 g/m$^2$ or less, and even more preferably 120, 110, or 100 g/m$^2$ or less.

Setting the basis weight in the above range enables the adsorbent including activated carbon to have more excellent adsorption-desorption performance demanded for use in a canister within a range of volume of adsorbent that is able to be stored in the canister. The form of an activated carbon fiber sheet may be suitably adopted, for example, as the adsorbent including activated carbon and having such an ultramicropore volume.

Sheet Thickness

When a formed product (an activated carbon sheet) having a sheet form is used as the adsorbent that may be used in the present invention and that includes activated carbon, the activated carbon sheet preferably has the following thickness.

The lower limit of thickness of the activated carbon sheet that is one embodiment of the present invention may be preferably 0.10 mm or more, more preferably 0.50 mm or more, and even more preferably 1.00, 1.50, 2.00, or 2.50 mm or more.

The upper limit of thickness of the activated carbon sheet that is one embodiment of the present invention may be preferably 50.00 mm or less, more preferably 40.00 mm or less, and even more preferably 30.00, 20.00, or 10.00 mm or less.

Setting the sheet thickness in the above range enables the sheet to have more excellent adsorption-desorption performance demanded for use in a canister within a range of volume of adsorbent that is able to be stored in the canister. Preferable examples of the activated carbon fiber sheet include an activated carbon sheet.

Density

The lower limit of density of the adsorbent that may be used in the present invention and includes activated carbon may be preferably 0.010 g/cm$^3$ or more, more preferably 0.015 g/cm$^3$ or more, and even more preferably 0.020 g/cm$^3$ or more.

The upper limit of density of the adsorbent that may be used in the present invention and includes activated carbon may be preferably 0.200 g/cm$^3$ or less, more preferably 0.100 g/cm$^3$ or less, and even more preferably 0.080, 0.070, 0.060, or 0.050 g/cm$^3$ or less.

Setting the density in the above range enables the adsorbent to have more excellent adsorption-desorption performance per volume demanded for use in a canister within a range of volume of adsorbent that is able to be stored in the canister. Furthermore, setting the lower limit to the above value or more prevents deterioration of the mechanical properties (for example, the strength) even if the adsorbent is provided in the form of a sheet. In addition, adjusting the density, together with another condition, such as the thickness of the sheet, pressure loss due to the adsorbent including activated carbon is able to be reduced. The form of an activated carbon fiber sheet may be suitably adopted, for example, as the adsorbent including activated carbon and having such a density.

The density of the adsorbent including activated carbon may be adjusted by, for example, the type and density of the precursor, or a process, such as compaction.

Tensile Strength (Machine Direction: MD)

When a formed product (an activated carbon sheet) having a sheet form is used as the adsorbent that may be used in the present invention and that includes activated carbon, the activated carbon sheet preferably has the following tensile strength (MD).

The lower limit of tensile strength (MD) of the activated carbon sheet that is one embodiment of the present invention may be preferably 0.005 kN/m or more, more preferably 0.007 kN/m or more, and even more preferably 0.009 kN/m or more.

The upper limit of tensile strength (MD) of the activated carbon sheet that is one embodiment of the present invention is not particularly limited and may be freely selected, but may be preferably 2.50 kN/m or less, more preferably 2.00 kN/m or less, and even more preferably 1.25, 1.00, 0.75, or 0.50 kN/m or less.

Setting the tensile strength (MD) in the above range enables the sheet to have flexibility. Therefore, an absorbent that has excellent workability, is difficult to be damaged, and is easy to use in operation including placement of the absorbent into a canister is able to be provided. An activated carbon fiber sheet may be suitably adopted, for example, as the activated carbon sheet having such a tensile strength (MD).

Tensile Strength (Cross Direction: CD)

When a formed product (an activated carbon sheet) having a sheet form is used as the adsorbent that may be used in the present invention and that includes activated carbon, the activated carbon sheet preferably has the following tensile strength (CD).

The lower limit of tensile strength (CD) of the activated carbon sheet that is one embodiment of the present invention may be preferably 0.005 kN/m or more, more preferably 0.007 kN/m or more, and even more preferably 0.009 kN/m or more.

The upper limit of tensile strength (CD) of the activated carbon sheet that is one embodiment of the present invention is not particularly limited and may be freely selected, but may be preferably 2.50 kN/m or less, more preferably 2.00 kN/m or less, and even more preferably 1.25, 1.00, 0.75, or 0.50 kN/m or less.

Setting the tensile strength (CD) in the above range enables the sheet to have flexibility. Therefore, an absorbent that has excellent workability, is difficult to be damaged, and is easy to use in operation including placement of the absorbent into a canister is able to be provided. An activated carbon fiber sheet may be suitably adopted, for example, as the activated carbon sheet having such a tensile strength (MD).

Moisture Content

An adsorbent having a given moisture content is suitable as the adsorbent that may be used in the present invention and that includes activated carbon. For example, the lower limit of moisture content at 23° C. and a relative humidity of 50% may be preferably 1% or more, more preferably 2% or more, and even more preferably 3% or more.

Furthermore, the upper limit of moisture content at 23° C. and a relative humidity of 50% may be preferably 25% or less, more preferably 20% or less, and even more preferably 10 or 8% or less.

Setting the moisture content in the above range under the above conditions enables the activated carbon to be more excellent as an adsorbent for motor vehicle canisters. The form of an activated carbon fiber sheet may be suitably adopted, for example, as the adsorbent including activated carbon and having such a moisture content.

Methylene Blue Adsorption Performance

The adsorbent that may be used in the present invention preferably has given methylene blue adsorption performance. The methylene blue absorption performance can be represented as an amount of adsorbed methylene blue per activated carbon fiber sheet weight. The methylene blue adsorption performance of the activated carbon fiber sheet of the present invention may be preferably 100 ml/g or more, more preferably 150 ml/g or more, and even more preferably 200, 250, 280, or 300 ml/g or more. The form of an activated carbon fiber sheet may be suitably adopted, for example, as activated carbon having such methylene blue adsorption performance.

N-Butane Adsorption-Desorption Performance

The adsorbent that may be used in the present invention and includes activated carbon preferably has given n-butane adsorption-desorption performance. The n-butane adsorption-desorption performance serves as an index of adsorption-desorption performance for vapor and any adsorbent having excellent n-butane adsorption-desorption performance is thus suitable for use in motor vehicle canisters. The n-butane adsorption-desorption performance can be represented as an effective amount of adsorbed n-butane per activated carbon weight. This effective amount of adsorbed n-butane per activated carbon weight is an amount of adsorbed n-butane in adsorption that is repeated subsequently to desorption of n-butane from the adsorbent under given desorption conditions after sufficient absorption breakthrough of n-butane in the adsorbent.

In a preferred embodiment of the adsorbent that may be used in the present invention and includes activated carbon, the lower limit of effective adsorption-desorption amount of n-butane (the average of second adsorption amount and desorption amount) determined according to a measurement method described with respect to Examples below may be preferably 3.00 wt % or more, more preferably 4.00 wt % or more, and even more preferably 5.00 wt % or more.

Furthermore, a preferred embodiment of the adsorbent that may be used in the present invention and includes activated carbon may have an effective adsorption-desorption ratio of n-butane that is preferably 20.0% or more, more preferably 25.0% or more, and even more preferably 30.0, 40.0, or 45.0% or more. This effective adsorption-desorption ratio of n-butane is determined according to a measurement method described with respect to Examples below.

The form of an activated carbon fiber sheet may be suitably adopted, for example, as the adsorbent including activated carbon and having such n-butane adsorption performance.

2. Adsorptive Layered Product

An adsorptive layered product to be stored in an adsorbent chamber of a canister may be provided as another embodiment of the present invention. This adsorptive layered product is a layered product having a plurality of activated carbon fiber sheets that have been superposed on one another.

The FIGURE illustrates an embodiment of the adsorptive layered product of the present invention. Dimensions, such as the length and thickness of the sheet, are schematically illustrated and are not limited to this illustration. Furthermore, the number of sheets is four in the illustrated example, but is not limited to the illustrated example.

An adsorptive layered product 1 illustrated in the FIGURE is a layered product formed of four activated carbon fiber sheets 10 superposed on one another. Major surfaces 10a of the activated carbon fiber sheets 10 are superposed on one another for the formation.

The adsorptive layered product 1 may be stored in a canister in any way. In a preferred embodiment, the adsorptive layered product 1 is preferably arranged such that the major surfaces 10a of the activated carbon fiber sheets are not orthogonal to the direction in which fluid F, such as vapor, flows, and more preferably, as illustrated in the FIGURE, the adsorptive layered product 1 may be arranged such that the major surfaces a become approximately parallel to the direction in which the fluid F, such as vapor, flows. The arrangement of the major surfaces a approximately parallel to the flow direction of the fluid F, such as vapor, places lateral end surfaces 10b of the plural activated carbon fiber sheets to be against the flow direction of the fluid F. This arrangement can reduce pressure loss. In the FIGURE, the lateral end surfaces 10b shorter in length are against the flow direction of the fluid F, but without being limited to this arrangement, longer lateral end surfaces 10c may be arranged to be against the flow direction of the fluid F.

Furthermore, the overall shape of the adsorptive layered product may be cuboidal or cubical. In addition, the shape of the adsorptive layered product may be adapted to the shape of the adsorbent chamber in which the activated carbon fiber sheets are stored, or the activated carbon fiber sheets may be rolled to form the adsorptive layered product into a cylindrical shape.

3. Canister

The activated carbon fiber sheet of the present invention is suitable as an adsorbent to be stored in a motor vehicle canister. That is, the present invention enables provision of a motor vehicle canister as another embodiment.

The motor vehicle canister of the present invention has the activated carbon fiber sheet installed therein as an adsorbent. The motor vehicle canister has a structure that is not particularly limited, and may have any common structure. For example, the motor vehicle canister may be a motor vehicle canister having the following structure.

A canister comprising:
a housing;
an adsorbent chamber to store an adsorbent in the housing;
a first opening to connect between the adsorbent chamber and an engine and allow gas to move between the adsorbent chamber and the engine;
a second opening to connect between the adsorbent chamber and a fuel tank and allow gas to move between the adsorbent chamber and the fuel tank; and
a third opening to open in response to application of a given pressure to the third opening from the adsorbent chamber or from outside air, connect between the adsorbent chamber and the outside air, and allow gas to move between the adsorbent chamber and the outside air.

The above described activated carbon fiber sheet of the present invention may be used as an absorbent in the canister of the present invention. As described above, because the activated carbon fiber sheet of the present invention enables reduction in pressure loss, even if the canister is filled with the activated carbon fiber sheet without any space left in the canister, pressure loss is able to be reduced more than that in a case where a conventional activated carbon fiber sheet is used.

The first, second, and third openings are inlet-outlets through which gas is let in and let out. The arrangement of these openings that are inlet-outlets for gas is not particularly limited, but the third opening that is an inlet-output for outside air is preferably arranged at a position enabling gas to sufficiently pass through the adsorbent when the gas moves between: the third opening; and the first opening and/or second opening. For example, in an embodiment that may be adopted, the first and second openings are provided on a first lateral surface of the housing and the third opening is provided on a second lateral surface located opposite to the first lateral surface.

The adsorbent chamber may have more than one chamber. For example, the adsorbent chamber may be divided into two or more sections by partition walls. The partition walls to be used may be porous plates having gas permeability. Furthermore, an additional adsorbent chamber may be installed by provision of an external second housing separately from the first housing so that the first housing and the second housing are connected to each other via a gas passage. In a case where plural sections or housings are provided as described above, in a preferred embodiment, adsorbents or adsorbent chambers may be provided so that adsorption capacities in these sections or housings decrease one by one from the first or second opening, into which gas from the engine or the fuel tank flows, toward the third opening.

Specific examples include a composite canister comprising a main canister (a first housing) and a second canister (a second housing) that is additionally provided to the main canister and that is near the intake for outside air. When plural sections or housings are provided in this manner, a high performance canister can be provided with reduced cost. Such a high performance canister has: a main body (a first section or a first housing) with the largest storage capacity; and a second or later section or housing with a relatively smaller storage capacity. This main body is a section or housing where vapor from the engine or fuel tank first flows into and conventional and inexpensive activated carbon is to be stored. The second or later section or housing is to store the active carbon fiber sheet of the present invention having excellent adsorption-desorption performance for a low concentration.

When there is more than one adsorbent chamber, fuel vapor flowing, from a preceding layer, into an adsorbent chamber positioned downstream from the engine or fuel tank (that is, the adsorbent chamber positioned closer to the inlet-outlet for outside air) has become lower in concentration. Therefore, activated carbon having high n-butane adsorption performance for a low concentration of about 0.2% is suitable as an adsorbent to be stored in a second section or second housing or a more downstream adsorbent chamber. This second section or housing or the more downstream adsorbent chamber is positioned downstream from the engine or fuel tank. Furthermore, use of the activated carbon in the adsorbent chamber closer to the intake for outside air enables reduction in the amount of leakage of fuel vapor upon long-term stoppage of the motor vehicle because the effective amount of adsorption-desorption by the activated carbon fiber sheet of the present invention through purging is large. In view of this effect also, the activated carbon fiber sheet of the present invention is suitable as an adsorbent to be used in a motor vehicle canister.

Therefore, preferred embodiments of the canister include the following embodiment.

The canister is a canister for a motor vehicle and comprises a main chamber and an auxiliary chamber that each store an adsorbent, the auxiliary chamber has a volume to store the adsorbent, the volume being smaller than that of the main chamber, and the auxiliary chamber is arranged at a position closer to an opening connected to outside air, compared to the main chamber, and the adsorbent of the present invention is stored in the auxiliary chamber.

In the above described embodiment, one main chamber and one auxiliary chamber may be provided, or two or more main chambers and two or more auxiliary chambers may be provided. In a case where three or more adsorbent chambers are provided, the activated carbon fiber sheet of the present invention may be stored in at least one adsorbent chamber of the auxiliary chambers and may be preferably provided in the auxiliary chamber that is closest to the opening connected to the outside air.

4. Method of Manufacturing Activated Carbon Fiber Sheet

Activated carbon that may be used in the adsorbent of the present invention can be manufactured by carbonizing and activating fiber having a given fiber size. Any common method may be adopted for the carbonization and activation.

Examples of an embodiment for manufacturing the activated carbon fiber sheet using a precursor sheet (a raw material sheet) will be described below.

Activated carbon used in the present invention is not limited to the sheet form. The activated carbon fiber sheet may be manufactured by using a precursor sheet (a raw material sheet) as described below, or powder of given activated carbon may be prepared and a base material, such as a sheet, may be caused to support the powder.

4-1. Preparation of Raw Material Sheet (Precursor Fiber Sheet)

Types of Fiber

Examples of fiber forming a raw material sheet may include cellulosic fiber, pitch-based fiber, PAN-based fiber, and phenol resin-based fiber, and preferably include cellulosic fiber.

Cellulosic Fiber

The cellulosic fiber refers to fiber composed mainly of cellulose and/or a derivative thereof. Origins of cellulose and cellulose derivatives may be any one or more of examples including chemically synthesized products, plant derived cellulose, regenerated cellulose, and cellulose produced by bacteria. Examples of the cellulosic fiber preferably used may include: fiber formed of a plant cellulose material obtained from plants, such as trees; and fiber formed of a long fibrous regenerated cellulose material obtained by dissolution of a plant cellulose material (such as cotton or pulp) through chemical treatment. The fiber may contain components, such as lignin and/or hemicellulose.

Examples of raw materials for the cellulosic fiber (the plant cellulose material or regenerated cellulose material) may include: plant cellulose fiber, such as cotton (such as short fiber cotton, medium fiber cotton, long fiber cotton, super long cotton, and ultra super long cotton), hemp, bamboo, kozo, mitsumata, banana, and tunicates; regenerated cellulose fiber, such as cuprammonium rayon, viscose rayon, polynosic rayon, and cellulose made from bamboo; purified cellulose fiber spun by use of organic solvent (N-methylmorpholine N-oxide); and acetate fiber, such as diacetate and triacetate. In terms of availability, a preferred one or preferred ones of these examples is/are at least one selected from cuprammonium rayon, viscose rayon, and purified cellulose fiber.

Filaments forming the cellulosic fiber preferably have a size of 5 to 75 μm and a density of 1.4 to 1.9 m$^3$/g.

Embodiments of the cellulosic fiber are not particularly limited, and according to purposes, the cellulosic fiber prepared into a form, such as raw yarn (unprocessed yarn), false twisted yarn, dyed yarn, single yarn, folded yarn, or covering yarn, may be used. When the cellulosic fiber includes two or more kinds of raw materials, the cellulosic fiber may be, for example, blended yarn or blended twisted yarn. Furthermore, the above-mentioned raw materials in various forms may be used alone or in combination of two or more as the cellulosic fiber. Non-twisted yarn is preferred among the above-mentioned raw materials for both moldability and mechanical strength of the composite material.

Fiber Sheet

A fiber sheet refers to a sheet obtained by processing a large number of filaments of fiber into a thin and wide sheet. Fiber sheets include woven fabric, knitted fabric, and nonwoven fabric.

Methods of weaving the cellulosic fiber are not particularly limited, and any common method may be used. Weaves of the woven fabric are not particularly limited either, and any of three foundation weaves, a plain weave, a twill weave, and a satin weave, may be used.

Spaces between warp yarns and between weft yarns of the cellulosic fiber in the woven fabric formed of the cellulosic fiber may range preferably from 0.1 to 0.8 mm, more preferably from 0.2 to 0.6 mm, and even more preferably from 0.25 to 0.5 mm. Furthermore, the woven fabric formed of the cellulosic fiber may have a mass per unit area ranging preferably from 50 to 500 g/m$^2$ and more preferably from 100 to 400 g/m$^2$.

Setting the spaces and the mass per unit area of the cellulosic fiber and the woven fabric formed of the cellulosic fiber in the above ranges enables carbon fiber woven fabric obtained by heat treatment of the woven fabric to have excellent strength.

Methods of manufacturing the nonwoven fabric are also not particularly limited. Examples of the methods may include: a method where a fiber sheet is obtained by use of a dry method or a wet method with the above-mentioned fiber serving as a raw material and having been cut into appropriate lengths; and a method where a fiber sheet is directly obtained from a solution using an electrospinning method. After the nonwoven fabric is obtained, treatment, such as resin bonding, thermal bonding, spun lacing, or needle punching, may be added for the purpose of bonding the filaments of fiber together.

4-2. Catalyst

In Embodiment 1 of the manufacturing method, a catalyst is held by the raw material sheet prepared as described above. The raw material sheet holding the catalyst is carbonized and further activated by using gas, such as steam, carbon dioxide, or air gas, and a porous activated carbon fiber sheet is able to be obtained. Examples of the catalyst that may be used include a phosphoric acid-based catalyst and an organic sulfonic acid-based catalyst.

Phosphoric Acid-Based Catalyst

Examples of the phosphoric acid-based catalyst may include: oxyacids of phosphorus, such as phosphoric acid, metaphosphoric acid, pyrophosphoric acid, phosphorous acid, phosphoric acid, phosphorous acid, and phosphinic acid; ammonium dihydrogen phosphate, diammonium hydrogen phosphate, triammonium phosphate, dimethyl phosphono propanamide, ammonium polyphosphate, and polyphosphonitrile chloride; and condensation products between: phosphoric acid, tetrakis (hydroxymethyl) phosphonium salt, or tris (1-aziridinyl) phosphine oxide; and urea, thiourea, melamine, guanine, cyanamide, hydrazine, dicyandiamide, or a methylol derivative of any one of these. Preferable examples may include diammonium hydrogen phosphate. One kind of phosphoric acid-based catalysts may be used alone or two or more kinds of phosphoric acid-based catalysts may be used in combination. When the phosphoric acid-based catalyst is used in the form of an aqueous solution, the phosphoric acid-based catalyst in the aqueous solution may have a concentration ranging preferably from 0.05 to 2.0 mol/L and more preferably from 0.1 to 1.0 mol/L.

Organic Sulfonic Acid-Based Catalyst

An organic compound having one or more sulfo groups can be used as the organic sulfonic acid. For example, a compound in which a sulfo group is bonded to any of various carbon skeletons of aliphatic series or aromatic series can be used. A preferred organic sulfonic acid-based catalyst has a low molecular weight in terms of handling of the catalyst.

Examples of the organic sulfonic acid-based catalyst may include compounds represented by R—$SO_3H$ where: R is a linear or branched alkyl group having 1 to 20 carbon atoms, a cycloalkyl group having 3 to 20 carbon atoms, or an aryl group having 6 to 20 carbon atoms; and each of the alkyl group, the cycloalkyl group and the aryl group optionally has a substituent of an alkyl group, a hydroxyl group, or a halogen group. Examples of the organic sulfonic acid-based catalyst may include methanesulfonic acid, ethanesulfonic acid, propanesulfonic acid, 1-hexanesulfonic acid, vinylsulfonic acid, cyclohexanesulfonic acid, p-toluenesulfonic acid, p-phenolsulfonic acid, naphthalenesulfonic acid, benzenesulfonic acid, and camphorsulfonic acid. Methanesulfonic acid may be preferably used among these examples. Furthermore, one kind of these organic sulfonic acid-based catalysts may be used alone, or two or more kinds of these organic sulfonic acid-based catalysts may be used in combination.

When the organic sulfonic acid is used in the form of an aqueous solution, the organic sulfonic acid in the aqueous solution has a concentration ranging preferably from 0.05 to 2.0 mol/L and more preferably from 0.1 to 1.0 mol/L.

Mixed Catalyst

The above-mentioned phosphoric acid-based catalyst and organic sulfonic acid-based catalyst may be mixed and used as a mixed catalyst. The mixing ratio may be adjusted as appropriate.

Holding of Catalyst

The catalyst is held by the raw material sheet. "Being held" means that the catalyst is kept in contact with the raw material sheet, and the catalyst may be held in various forms through, for example, adhesion, adsorption, or impregnation. Methods for the catalyst to be held by the raw material sheet are not particularly limited and may include, for example, a method of immersing the raw material sheet in an aqueous solution containing the catalyst, a method of sprinkling an aqueous solution containing the catalyst over the raw material sheet, a method of causing the raw material sheet to be in contact with vapor that is the catalyst that has been vaporized, and a method of mixing the fiber of the raw material sheet into an aqueous solution containing the catalyst to make paper.

A method that can be preferably used for sufficient carbonization is a method of immersing the raw material sheet in an aqueous solution containing the catalyst to impregnate the fiber with the catalyst such that the catalyst reaches the inside of the fiber. The temperature for the immersion in the aqueous solution containing the catalyst is not particularly limited and may be preferably room temperature. The immersion time ranges preferably from 10 seconds to 120 minutes and more preferably from 20 seconds to 30 minutes. The immersion allows the fiber forming the raw material sheet to adsorb, for example, 1 to 150% by mass and preferably 5 to 60% by mass, of the catalyst. After the immersion, the raw material sheet is preferably taken out from the aqueous solution and dried. A method of drying the raw material sheet may be, for example, any of methods including a method of leaving the raw material sheet at room temperature or putting the raw material sheet in a dryer. The drying may be performed until the sample no longer changes in weight by evaporation of excess moisture after the sample is removed from the aqueous solution containing the catalyst. For example, in the drying at room temperature, the drying time for which the raw material sheet is left may be 0.5 days or more. When the raw material sheet holding the catalyst almost no longer changes in mass because of the drying, the step of carbonizing the raw material sheet holding the catalyst is performed.

4-3. Carbonization

After being prepared, the raw material sheet holding the catalyst is subjected to carbonization treatment. The carbonization treatment for obtaining the activated carbon fiber sheet may be performed according to a common method of carbonizing activated carbon. A preferred embodiment of the carbonization treatment may be performed as follows.

The carbonization treatment is usually performed under an inert gas atmosphere. According to the present invention, the inert gas atmosphere means an oxygen-free or low-oxygen atmosphere in which carbon is difficult to undergo a combustion reaction and is thus carbonized. The inert gas atmosphere may be preferably an atmosphere including gas, such as argon gas or nitrogen gas.

The raw material sheet holding the catalyst is subjected to heat treatment and carbonized in the given gas atmosphere mentioned above.

The lower limit of the heating temperature may be preferably 300° C. or higher, more preferably 350° C. or higher, and even more preferably 400° C. or higher or 750° C. or higher.

The upper limit of the heating temperature may be preferably 1400° C. or lower, more preferably 1300° C. or lower, and even more preferably 1200° C. or lower or 1000° C. or lower.

Setting the heating temperature as described above enables obtainment of a carbon fiber sheet with its fiber form maintained. If the heating temperature is lower than the above-mentioned lower limit, the carbon fiber may have a carbon content of 80% or less and carbonization thus tends to be insufficient.

The lower limit of the heat treatment time including the time for the temperature to rise may be preferably 10 minutes or more, more preferably 11 minutes or more, even more preferably 12 minutes or more, and still even more preferably 30 minutes or more.

The upper limit of the heat treatment time may be freely selected, but may be preferably 180 minutes or less, more preferably 160 minutes, and even more preferably 140 minutes or less.

Sufficiently impregnating the raw material sheet with the catalyst, setting the above-mentioned suitable heating temperature, and adjusting the heat treatment time enable adjustment of the degree of progress of pore formation and thus adjustment of the physical properties of the porous body, such as the specific surface area, the volume of the various pores, and the average pore diameter.

If the heat treatment time is shorter than the above lower limit, carbonization tends to be insufficient.

Furthermore, the heat treatment may include further reheating treatment in a given gas atmosphere after the above-described heat treatment (which may be referred to as primary heat treatment). That is, the carbonization treatment may be performed by dividing the heat treatment into two or more stages having different conditions, such as temperature conditions. Performing the primary heat treatment and the reheating treatment under predetermined conditions may enable adjustment of the physical properties, promotion of the carbonization and the subsequent activation, and thus obtainment of an activated carbon fiber sheet having excellent adsorption and desorption properties.

4-4. Activation Treatment

The activation treatment according to the present invention may be, for example, performed continuously after the above-described heat treatment, by providing steam and keeping an appropriate activation temperature for a predetermined time, and enables obtainment of the activated carbon fiber sheet.

The lower limit of the activation temperature may be preferably 300° C. or higher, more preferably 350° C. or higher, and even more preferably 400 or 750° C. or higher.

The upper limit of the activation temperature, on the other hand, may be preferably 1400° C. or lower, more preferably 1300° C. or lower, and even more preferably 1200 or 1000° C. or lower.

When the activation treatment is performed continuously after the heat treatment, the activation temperature is preferably adjusted to a temperature that is almost the same as the heating temperature.

The lower limit of the activation time may be preferably one minute or more, and more preferably five minutes or more.

The upper limit of the activation time may be freely selected, but may be preferably 180 minutes or less, more preferably 160 minutes or less, and even more preferably 140 minutes or less, 100 minutes or less, 50 minutes or less, or 30 minutes or less.

EXAMPLES

The present invention will hereinafter be described specifically by reference to examples, but the technical scope of the present invention is not limited to the following examples.

Various items related to physical properties and performance of activated carbon fiber sheets and granular activated carbon were measured and evaluated by methods described below. Various numerical values defining the present invention can be determined by the following measurement methods and evaluation methods.

Specific Surface Area

About 30 mg of an activated carbon fiber sheet were sampled, vacuum-dried at 200° C. for 20 hours, weighed, and measured using a high-precision gas/vapor adsorption amount measuring apparatus, BELSORP-MAX II (MicrotracBEL Corp.). The adsorption amount of nitrogen gas at the boiling point of liquid nitrogen (77 K) was measured at a relative pressure ranging from the $10^{-8}$ order to 0.990, and an adsorption isotherm of the sample was thereby prepared. This adsorption isotherm was analyzed by the BET method for which the relative pressure range for analysis had been automatically determined under the conditions of the adsorption isotherm of Type I (ISO 9277), and the BET specific surface area per weight (unit: $m^2/g$) was determined as a specific surface area (unit: $m^2/g$).

Total Pore Volume

The total pore volume (unit: $cm^3/g$) by a one-point method was calculated on the basis of the result at the relative pressure of 0.990 on the adsorption isotherm obtained according to the above description related to the specific surface area.

Average Pore Size (Average Pore Diameter); Unit: nm

Calculation was performed using Equation 5 below.

$$\text{Average pore diameter} = 4 \times \text{total pore volume} \times 10^3 \div \text{specific surface area} \quad \text{(Equation 5)}$$

Ultramicropore Volume

The adsorption isotherm obtained according to the above description related to the specific surface area was analyzed using the analysis software BELMaster pertaining to the high-precision gas/vapor adsorption amount measuring apparatus, BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore size: Solid and Fluid Def. Pore Size," and "Kernel: Slit-C-Adsorption." The integrated pore volume at 0.7 nm was read from the obtained pore distribution curve for adsorption, the integrated pore volume serving as the ultramicropore volume (unit: $cm^3/g$).

Micropore Volume

The adsorption isotherm obtained according to the above description related to the specific surface area was analyzed using the analysis software, BELMaster, pertaining to the high-precision gas/vapor adsorption amount measuring apparatus, BELSORP-MAX II (MicrotracBEL Corp.), through the GCMC method with the analysis settings set as follows: "Smoothing (moving average processing using one point each before and after every analyzed point of the pore distribution)," "Distribution function: No-assumption,"

"Definition of pore size: Solid and Fluid Def. Pore Size," and "Kernel: Slit-C-Adsorption." The integrated pore volume at 2.0 nm was read from the obtained pore distribution curve for adsorption, the integrated pore volume serving as the micropore volume (unit: cm$^3$/g).

Basis Weight of Sheet

After the activated carbon fiber sheet was allowed to stand for 12 hours or more under the environment where the temperature was 23±2° C. and the relative humidity was 50±5%, the basis weight (unit: g/m$^2$) of the sheet was determined from the weight and the lengthwise and widthwise dimensions of the sheet.

Sheet Thickness

The activated carbon fiber sheet was allowed to stand for 12 hours or more under the environment where the temperature was 23±2° C. and the relative humidity was 50±5%, and the thickness (unit: mm) of the sheet was then measured using a small digital thickness measuring device, FS-60DS (Daiei Kagaku Seiki Mfg. Co., Ltd.), with a load of 0.3 kPa applied to the sheet.

Density of Sheet; Unit: g/cm$^3$

Calculation was performed using Equation 6 below.

$$\text{Sheet density} = \text{basis weight of sheet} \div \text{sheet thickness} \div 10^3 \quad \text{(Equation 6)}$$

Tensile Strength (MD) and Tensile Strength (CD); Unit: kN/m

A sample was allowed to stand for 12 hours or more under the environment where the temperature was 23±2° C. and the relative humidity was 50±5%. Test pieces (each with a width of 15 mm and a length of 50 to 60 mm) were then cut out from the sheet along Machine Direction (MD) or Cross Direction (CD) orthogonal to Machine Direction (MD) so that lengths of the test pieces were respectively along Machine Direction and along Cross Direction. Using Tensilon universal testing instrument RTG-1210 (A & D Co. Ltd.), the test pieces were pulled with the length between grips at 40 mm and the pulling speed at 100 ram/min. The tensile strength (unit: kN/m) was then calculated by Equation 7 below.

Equation 7: Tensile Strength (Unit: kN/m)

$$\text{Tensile strength} = \text{maximum load applied during test} \div 15 \text{ mm} \quad \text{(Equation 7)}$$

The maximum load applied during test (Unit: N).

Moisture Content

The activated carbon fiber sheet was allowed to stand for 12 hours or more under the environment where the temperature was 23±2° C. and the relative humidity was 50±5%, a sample of 0.5 to 1.0 g was thereafter collected from the sheet and dried at 115±5° C. for three hours or more in a dryer, and moisture (unit: %) was determined from change in weight of the dried sample.

Methylene Blue Adsorption Performance

Measurement according to methylene blue decolorizing power (unit: ml/g) of powdered activated carbon for water supply conforming to Japan Water Works Association standards (JWWA K113) was performed, and results of the measurement were determined as the methylene blue adsorption performance (unit: ml/g).

N-Butane Adsorption-Desorption Performance

The concentration and flow rate of n-butane and the flow rate of air for desorption were independently set to perform tests by reference to Standard Test Method for Determination of Butane Working Capacity of Activated Carbon (ASTM D5228-16) of the American Society for Testing and Materials Standards.

An adsorbent sample was dried at 115±5° C. for 3 hours or more in a dryer and the weight of the dried adsorbent sample was measured after the dried adsorbent sample was cooled. After the mass of an empty test tube (a glass tube having an inner diameter of 1.47 cm, a cross-sectional area of 1.67 cm$^2$, a length of 10 cm filled with the sample, and a volume of 16.7 ml filled with the sample) was measured, the adsorption tube was filled with 16.7 ml of the adsorbent sample. For example, the activated carbon fiber sheet was cut to obtain a sheet having a size of 16.7 ml=sheet thickness×length of 10 cm×width and the test tube was filled with the sheet that has been rolled up.

Subsequently, the test tube was placed in a flow apparatus and n-butane gas diluted with air to a concentration of 0.2% was fed into the test tube at 500 ml/min at a test temperature of 25° C. to cause adsorption of n-butane. The test tube was removed from the flow apparatus and the mass of the test tube removed was measured. This feeding of the 0.2% n-butane gas was repeated until constant mass was achieved, that is, until the amount of adsorption was saturated.

The test tube was reinstalled into the flow apparatus and air was fed into the test tube at a test temperature of 25° C. for three minutes and 48 seconds at 4.0 L/min to cause desorption of n-butane. The test tube was removed from the flow apparatus and the mass of the test tube removed was measured.

These adsorption and desorption processes were repeated so as to be performed twice in total, and the first adsorption amount, the effective adsorption-desorption amount, and the effective adsorption-desorption ratio were calculated using Equations 8, 9, and 10 below.

$$\text{First adsorption amount} = \text{first amount of } n\text{-butane adsorbed} \div \text{dry weight of adsorbent sample} \times 100 \quad \text{Equation 8}$$

The units of the numerical values are as follows.
First adsorption amount (unit: wt %)
First amount of n-butane adsorbed (unit: g)
Dry weight of adsorbent sample (unit: g)

$$\text{Effective adsorption-desorption amount} = \{\text{second amount of } n\text{-butane adsorbed} + \text{second amount of } n\text{-butane desorbed}\} \div 2 \div \text{dry weight of adsorbent sample} \times 100 \quad \text{Equation 9}$$

The units of the numerical values are as follows.
Effective adsorption-desorption amount (unit: wt %)
Second amount of n-butane adsorbed (unit: g)
Second amount of n-butane desorbed (unit: g)
Dry weight of adsorbent sample (unit: g)

$$\text{Effective adsorption-desorption ratio} = \text{effective adsorption-desorption amount} \div \text{first adsorption amount} \times 100 \quad \text{Equation 10}$$

The units of the numerical values are as follows.
Effective adsorption-desorption ratio (unit: %)
Effective adsorption-desorption amount (unit: wt %)
First adsorption amount (Unit: wt %)

Adsorbed Amounts at Different Pressures (unit: wt % or g/100 g)

About 100 mg of an adsorbent sample were sampled, vacuum-dried at 200° C. for 20 hours, weighed, and measured using a high-precision gas/vapor adsorption amount measuring apparatus, BELSORP-MAX II (MicrotracBEL Corp.). Amounts of adsorbed n-butane gas at 25° C. were measured at absolute pressures ranging from 0.1 to 105 kPa and an n-butane adsorption isotherm (unit: g) of the sample was generated. This n-butane adsorption isotherm was divided by the dry weight (unit: g) of the sample and an n-butane adsorption isotherm (unit: wt %) was generated.

Amounts of n-butane gas adsorbed at 0.2 kPa, 0.5 kPa, 5 kPa, 50 kPa, and 100 kPa were read from this adsorption isotherm. Of these, the amounts of n-butane gas adsorbed at 0.2 kPa, 100 kPa, and 50 kPa were referred to as X, Y, and Z. They will be described as follows.

(1) X (unit: wt % or g/100 g): amount (unit: g) of n-butane gas adsorbed per 100 g of the adsorbent at 25° C. under an atmosphere where a gas pressure of n-butane gas is 0.2 kPa (2) Y (unit: wt % or g/100 g): amount (unit: g) of n-butane gas adsorbed per 100 g of the adsorbent at 25° C. under an atmosphere where a gas pressure of n-butane gas is 100 kPa (3) Z (unit: wt % or g/100 g): amount (unit: g) of n-butane gas adsorbed per 100 g of the adsorbent at 25° C. under an atmosphere where a gas pressure of n-butane gas is 50 kPa Adsorbed Amount Ratio Between Different Pressures (Unit: %)

From the measured values X, Y, and Z obtained as described above, $P_{0.2/100}$ was calculated by Equation 1 and $P_{100/50}$ was calculated by Equation 2.

$$P_{0.2/100} = X \div Y \times 100 \quad \text{(Equation 1)}$$

$$P_{100/50} = Y \div Z \times 100 \quad \text{(Equation 2)}$$

Example 1

A needle-punched nonwoven fabric made of rayon fiber (at 17.0 dtex, having a fiber length of 76 mm) and having a basis weight of 300 g/m² was impregnated with 6 to 10% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 50 minutes and was kept at this temperature for four minutes. Continuously at that temperature, activation treatment was performed for 18 minutes in a nitrogen gas stream containing steam with a dew point of 71° C.

Example 2

An activated carbon fiber sheet of Example 2 was prepared by the same method as Example 1, except that a needle-punched nonwoven fabric made of rayon fiber (at 7.8 dtex, having a fiber length of 51 mm) and having a basis weight of 300 g/m² was used in Example 2.

Example 3

An activated carbon fiber sheet of Example 3 was prepared by the same method as Example 1, except that a needle-punched nonwoven fabric made of rayon fiber (at 1.7 dtex, having a fiber length of 40 mm) and having a basis weight of 300 g/m² was used in Example 3.

Example 4

A needle-punched nonwoven fabric made of rayon fiber (at 17.0 dtex, having a fiber length of 76 mm) and having a basis weight of 300 g/m² was impregnated with 4 to 8% methanesulfonic acid aqueous solution, wrung out, and dried, to have 6 to 8% by weight of methanesulfonic acid attached to the nonwoven fabric. The obtained pretreated nonwoven fabric was heated in a nitrogen atmosphere to 900° C. in 40 minutes, and was kept at this temperature for three minutes. Continuously at that temperature, activation treatment was performed for 16 minutes in a nitrogen gas stream containing steam with a dew point of 71° C.

Comparative Example 1

A needle-punched nonwoven fabric made of rayon fiber (at 17.0 dtex, having a fiber length of 76 mm) and having a basis weight of 400 g/m² was impregnated with 6 to 10% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 950° C. in 50 minutes, and was kept at this temperature for four minutes. Continuously at that temperature, activation treatment was performed for 18 minutes in a nitrogen gas stream containing steam with a dew point of 71° C.

Comparative Example 2: Granular Activated Carbon

Granular activated carbon filling a commercially available canister was taken out and used as an adsorbent of Comparative Example 2. The commercially available canister used was a canister having a product number of 14950-01F0A (Nissan Motor Co., Ltd.).

Comparative Example 3: Granular Activated Carbon

Granular activated carbon filling a commercially available canister was taken out and used as an adsorbent of Comparative Example 3. The commercially available canister used was a canister having a product number of 77740-48220 (Toyota Buhin Yamaguchi Kyohan, K. K.).

For the activated carbon of Examples 1 to 4 and Comparative Examples 1 to 3, measured values related to the above described items were respectively determined according to the measurement methods described above. Tables 1-1 and 1-2 have the results listed therein.

TABLE 1-1

Measurement Results

| | Item | | Example 1 ACF sheet | Example 2 ACF sheet | Example 3 ACF sheet | Example 4 ACF sheet | Reference standard Analysis method |
|---|---|---|---|---|---|---|---|
| | Precursor fineness | dtex | 17.0 | 7.8 | 1.7 | 17.0 | |
| N₂ adsorption BET analysis | Specific surface area | m²/g | 2090 | 1870 | 2020 | 1290 | JIS K 1477 |
| | Total pore volume | cm³/g | 0.97 | 0.84 | 0.93 | 0.55 | Basic physical properties related |
| | Average pore diameter | nm | 1.85 | 1.80 | 1.84 | 1.71 | to adsorption performance |

TABLE 1-1-continued

| | Item | | Example 1 ACF sheet | Example 2 ACF sheet | Example 3 ACF sheet | Example 4 ACF sheet | Reference standard Analysis method |
|---|---|---|---|---|---|---|---|
| N$_2$ adsorption GCMC analysis | a) Ultramicropore volume [1] | cm$^3$/g | 0.15 | 0.16 | 0.18 | 0.32 | Simulation analysis, Grand Canonical Monte Carlo method |
| | b) Micropore volume [2] | cm$^3$/g | 0.75 | 0.68 | 0.73 | 0.51 | |
| | b) − a) | cm$^3$/g | 0.59 | 0.52 | 0.56 | 0.19 | |
| | a)/b) | % | 20.8 | 23.1 | 24.2 | 63.1 | |
| Physical properties of sheet | Basis weight | g/m$^2$ | 84.6 | 96.3 | 104.8 | 141.3 | |
| | Thickness | mm | 2.69 | 2.68 | 2.21 | 3.23 | Pressed and measured at 0.3 kPa |
| | Density | g/cm$^3$ | 0.031 | 0.036 | 0.048 | 0.044 | |
| Physical properties of sheet | Tensile strength MD | kN/m | 0.05 | 0.09 | 0.20 | 0.06 | |
| | Tensile strength CD | | 0.01 | 0.03 | 0.17 | 0.01 | |
| Moisture (at 23° C., RH of 50%) | | % | 4.0 | 4.1 | 4.7 | 10.7 | JIS K 1477 |
| Methylene blue adsorption performance | | ml/g | 330 | 300 | 100 | 100 | JIS K 1477, JWWA K 113 |
| N-butane adsorption amounts at different pressures at 25° C. | 0.2 kPa | wt % (g/100 g) | 13.0 | 12.7 | 12.6 | 16.2 | |
| | 0.5 kPa | | 18.3 | 17.5 | 17.7 | 19.0 | |
| | 5 kPa | | 34.8 | 30.9 | 33 | 24.2 | |
| | 50 kPa | | 49.7 | 40.9 | 46.4 | 27.7 | |
| | 100 kPa | | 52.1 | 42.4 | 48.4 | 28.7 | |
| N-butane adsorption amount ratio between different pressures at 25° C. | 0.2 kPa ÷ 100 kPa | % | 25% | 30% | 26% | 56% | |
| | 100 kPa ÷ 50 kPa | | 105% | 104% | 104% | 104% | |
| 0.2% N-butane adsorption-desorption performance | First adsorption amount | wt % | 14.50 | 14.71 | 14.48 | 17.32 | |
| | Effective adsorption-desorption amount [3] | | 8.77 | 7.25 | 6.07 | 6.54 | |
| | Effective adsorption-desorption ratio [4] | % | 60.5 | 49.3 | 41.9 | 37.7 | |

[1] Pore size of 0.7 nm or smaller
[2] Pore size of 2.0 nm or smaller
[3] Average of second adsorption amount and second desorption amount
[4] (Effective adsorption-desorption amount/first adsorption amount) × 100 (%)

TABLE 1-2

| | Item | | Comparative Example 1 ACF sheet | Comparative Example 2 Granular activated carbon | Comparative Example 3 Granular activated carbon | Reference standard Analysis method |
|---|---|---|---|---|---|---|
| Precursor fineness | | dtex | 17 | — | — | |
| N$_2$ adsorption BET analysis | Specific surface area | m$^2$/g | 2570 | 1460 | 1640 | JIS K 1477 |
| | Total pore volume | cm$^3$/g | 1.29 | 1.05 | 1.29 | Basic physical properties related to adsorption performance |
| | Average pore diameter | nm | 2.01 | 2.88 | 3.14 | |
| N$_2$ adsorption GCMC analysis | a) Ultramicropore volume [1] | cm$^3$/g | 0.15 | 0.13 | 0.09 | Simulation analysis, Grand Canonical Monte Carlo method |
| | b) Micropore volume [2] | cm$^3$/g | 0.81 | 0.48 | 0.44 | |
| | b) − a) | cm$^3$/g | 0.66 | 0.35 | 0.35 | |
| | a)/b) | % | 17.9 | 26.2 | 19.6 | |
| Physical properties of sheet | Basis weight | g/m$^2$ | 72.3 | — | — | |
| | Thickness | mm | 2.49 | — | — | Pressed and measured at 0.3 kPa |
| | Density | g/cm$^3$ | 0.029 | 0.47 | 0.26 | |
| Physical properties of sheet | Tensile strength MD | kN/m | 0.07 | — | — | |
| | Tensile strength CD | | 0.06 | — | — | |
| Moisture (at 23° C., RH of 50%) | | % | 2 | 27.5 | 11 | JIS K 1477 |
| Methylene blue adsorption performance | | ml/g | 300 | 0 | 10 | JIS K 1477, JWWA K 113 |
| N-butane adsorption amounts at different pressures at 25° C. | 0.2 kPa | wt % (g/100 g) | 11.2 | 6.4 | 5.0 | |
| | 0.5 kPa | | 16.9 | 10.0 | 7.8 | |
| | 5 kPa | | 34.7 | 19.3 | 18.9 | |
| | 50 kPa | | 57.7 | 30.8 | 37.4 | |
| | 100 kPa | | 64.2 | 37.4 | 47.0 | |
| N-butane adsorption amount ratio between different pressures at 25° C. | 0.2 kPa ÷ 100 kPa | % | 17% | 17% | 11% | |
| | 100 kPa ÷ 50 kPa | | 111% | 122% | 126% | |

TABLE 1-2-continued

Measurement Results

| Item | | | Comparative Example 1 ACF sheet | Comparative Example 2 Granular activated carbon | Comparative Example 3 Granular activated carbon | Reference standard Analysis method |
|---|---|---|---|---|---|---|
| 0.2% N-butane adsorption-desorption performance | First adsorption amount | wt % | 12.3 | 4.81 | 4.62 | |
| | Effective adsorption-desportion amount[3] | | 5.92 | 1.20 | 1.41 | |
| | Effective adsorption-desorption ratio [4] | % | 48.2 | 24.9 | 30.5 | |

[1] Pore size of 0.7 nm or smaller
[2] Pore size of 2.0 nm or smaller
[3] Average of second adsorption amount and second desorption amount
[4] (Effective adsorption-desorption amount/first adsorption amount) × 100 (%)

LIST OF REFERENCE SIGNS

1 ADSORPTIVE LAYERED PRODUCT
10 ACTIVATED CARBON FIBER SHEET
10a MAJOR SURFACE OF ACTIVATED CARBON FIBER SHEET
10b LATERAL END SURFACE OF ACTIVATED CARBON FIBER SHEET
10c LATERAL END SURFACE OF ACTIVATED CARBON FIBER SHEET
F FLOW DIRECTION OF GAS

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adsorbent comprising: activated carbon, the adsorbent being used for a canister, and having $P_{0.2/100}$ of 18% or more, wherein
$P_{0.2/100}$ is expressed by Equation 1:

$$P_{0.2/100} = X \div Y \times 100 \quad \text{(Equation 1)},$$

in Equation 1, X represents an amount of adsorbed n-butane gas (unit: parts by weight) per 100 parts by weight of the adsorbent at 25° C. under an atmosphere where a gas pressure of n-butane gas is 0.2 kPa, and
Y represents an amount of adsorbed n-butane gas (unit: parts by weight) per 100 parts by weight of the adsorbent at 25° C. under an atmosphere where a gas pressure of n-butane gas is 100 kPa.

2. The adsorbent according to claim 1, wherein $P_{0.2/100}$ is 21% or more.

3. The adsorbent according to claim 1, wherein $P_{100/50}$ expressed by Equation 2:

$$P_{100/50} = Y \div Z \times 100 \quad \text{(Equation 2)}$$

is 120% or less,
in Equation 2, Z represents an amount of adsorbed n-butane gas (unit: parts by weight) per 100 parts by weight of the adsorbent at 25° C. under an atmosphere where a gas pressure of n-butane gas is 50 kPa, and
Y is the same as Y in Equation 1.

4. The adsorbent according to claim 3, wherein $P_{100/50}$ is 115% or less.

5. The adsorbent according to claim 1, wherein a specific surface area of the adsorbent is 2500 m²/g or less.

6. The adsorbent according to claim 1, wherein a total pore volume of the adsorbent ranges from 0.50 to 1.20 cm³.

7. The adsorbent according to claim 1, wherein an average pore size of the adsorbent ranges from 1.50 to 2.00 nm or less.

8. The adsorbent according to claim 1, wherein a density of the adsorbent ranges from 0.010 to 0.200 g/cm³.

9. The adsorbent according to claim 1, wherein the adsorbent is a formed product of activated carbon fiber.

10. The adsorbent according to claim 1, wherein the adsorbent is for a canister to be used in a motor vehicle.

11. A canister comprising:
the adsorbent according to claim 1.

12. The canister according to claim 11, wherein
the canister is a canister for a motor vehicle and comprises a main chamber and an auxiliary chamber that each store an adsorbent,
the auxiliary chamber has a volume to store the adsorbent, the volume being smaller than that of the main chamber, and the auxiliary chamber is arranged at a position closer to an opening connected to outside air, compared to the main chamber, and
the adsorbent is stored in the auxiliary chamber.

13. A canister comprising:
the adsorbent according to claim 3.

14. The canister according to claim 13, wherein
the canister is a canister for a motor vehicle and comprises a main chamber and an auxiliary chamber that each store an adsorbent,
the auxiliary chamber has a volume to store the adsorbent, the volume being smaller than that of the main chamber, and the auxiliary chamber is arranged at a position closer to an opening connected to outside air, compared to the main chamber, and
the adsorbent is stored in the auxiliary chamber.

* * * * *